United States Patent [19]

Mooney

[11] 3,885,093

[45] May 20, 1975

[54] FAST ACTING DIRECT CURRENT CLAMPING CIRCUIT

[75] Inventor: Daniel L. Mooney, Marcola, Oreg.

[73] Assignee: Ampex Corporation, Redwood City, Calif.

[22] Filed: June 14, 1973

[21] Appl. No.: 370,138

Related U.S. Application Data

[63] Continuation-in-part of Ser. No. 240,729, April 3, 1972, Pat. No. 3,748,386.

[52] U.S. Cl. .......................... 178/7.3 DC; 307/237

[51] Int. Cl. .......................... H04n 5/18; H03k 5/08

[58] Field of Search .............. 307/237; 178/DIG. 26 178/7.3 DC, 7.5 DC

[56] References Cited

UNITED STATES PATENTS 2,843,662 7/1958 Rieke .......................... 178/DIG. 26

*Primary Examiner*—Robert L. Griffin
*Assistant Examiner*—George G. Stellar

[57] ABSTRACT

A fast acting direct current clamping circuit for a video signal employing electrical isolation devices so that the video signal can be clamped to a selected reference voltage without passing the signal through the clamping circuit. Featured circuitry also includes positive and negative ramp generators respectively responsive to the leading and trailing edges of the horizontal synchronizing signal associated with the video signal being clamped. The ramp generators cooperate to establish the desired clamp voltage on the line along which the video signal passes.

4 Claims, 5 Drawing Figures

FAST ACTING DIRECT CURRENT CLAMPING CIRCUIT

This application is a continuation-in-part of application Ser. No. 240,729, filed Apr. 3, 1972, entitled "Time-Base Error Correction System", now U.S. Pat. No. 3,748,386.

The present invention generally relates to clamping circuitry and, more particularly, to a fast acting direct current clamping circuit for restoring a signal to a desired voltage level.

In many electrical signal processing systems, the processing of the signal introduces errors in the voltage level to which the signal is referenced. Often, it is desirable or necessary to restore the signal to the proper reference voltage level and, thereby, eliminate the errors introduced during the processing. When such restoration must be accomplished rapidly, fast acting or hard clamp circuits are utilized. Conventional hard clamp circuits have been found disadvantageous in the past due to their use of reactive capacitive components directly in the video signal path. The reactive components introduce tilt in the video. Also, the fast-acting switching in shunt with the video signal path causes undesirable spike effects in the video signal disrupting the information carried thereby. In contrast, the hard clamp of the present invention has the characteristic advantage of isolating the clamping circuitry from the signal path. As will be described in greater detail, hereinafter, the video signal path does not pass through any reactive components nor are there any switching elements immediately in communication with the path. A further characteristic feature of this particular clamping circuit is its extremely fast response, functioning quickly enough to clamp each video line of a video signal during the synchronizing tip of the horizontal blanking interval.

It is an object of the present invention to provide an improved clamping arrangement particularly suited for use in a time-base error correction system of the type described herein, for eliminating d.c. offset errors in a signal.

It is a further object of the invention to provide an improved fast acting and more reliable d.c. clamping circuit capable of correcting d.c. offset errors in a video signal on a line-by-line basis. Line-by-line refers to successive horizontal lines of video.

These and other objects are achieved in accordance with the present invention by coupling the input and output of a d.c. clamping circuit to a junction along the path of the signal to be restored to a desired reference voltage. The circuit's input and output are coupled through circuit isolation devices or impedance buffer means so that the operation of the clamping circuit does not introduce undesirable effects in the signal path. The d.c. clamping circuit includes a comparator which is controlled to examine a portion of the signal relative to a reference. A current source is responsive to the comparison to cause current to be delivered to a storage device so that a desired voltage level is maintained in the storage device at all times. The output of the storage device is connected by one of the isolation devices or impedance buffer means to the junction in the signal path so that the voltage at the junction assumes a value determined by the instantaneous amount of voltage stored in the storage device. If the reference voltage of the signal changes from the desired level, the current source responsively causes the voltage at the junction to be restored to the proper level because the current delivered to the storage device maintains the voltage stored therein at the level corresponding to the proper signal reference voltage level.

A full disclosure of the present invention and the presently preferred embodiment thereof is provided below in conjunction with the drawings in which.

Figures 1, 2:
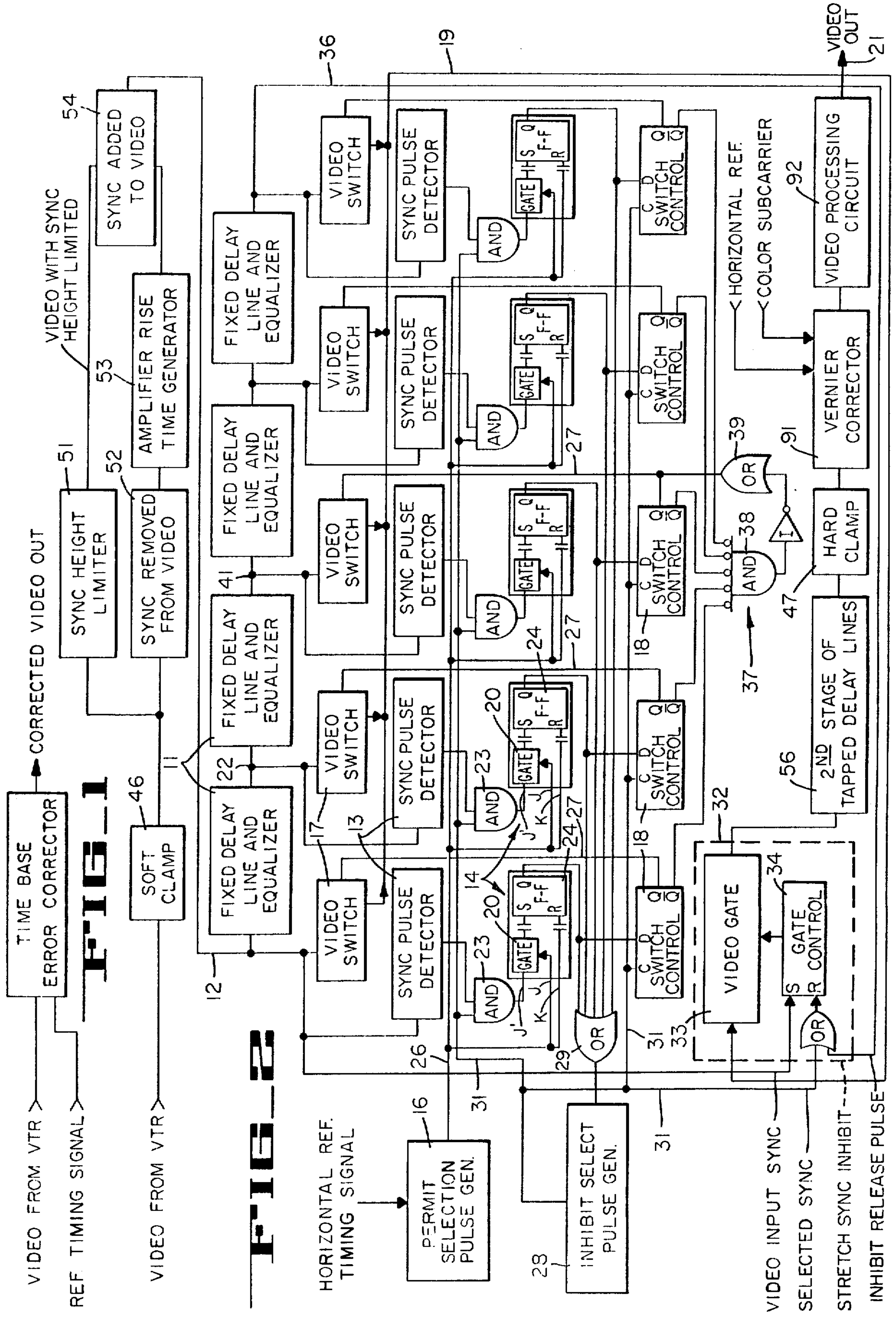
FIG. 1 is a block diagram illustrating generally a time-base error correction system.
FIG. 2 is a comprehensive block diagram of the time-base error correction system.

The environment in which the present invention functions is illustrated generally by FIG. 1, in which a time-base error corrector is adapted to receive a video signal from a video tape recorder (VTR) and to detect any timing errors in this signal relative to a reference timing waveform. The video is selectively delayed in response to measured time-base error and issued as a corrected signal at the output. FIG. 2 illustrates the time-base error correction system as including a plurality of fixed delay lines and equalizer 11 connected in a serial signal path with an input line 12 adapted to receive a video signal from the VTR. As the video signal passes through this series of lines, it is differentially delayed at the various taps or junctions associated with the lines and one of these taps is selected by detection circuitry for connection to an output. The detection circuitry, including a set of sync pulse detectors 13, sequence detection circuits 14, and a permit selection pulse generator 16, serves to sense the line tap at which a leading edge of the video synchronizing waveform, in this instance of a horizontal line, first occurs in time following the corresponding leading edge of a horizontal reference timing waveform. In response to this detection, switching circuitry in the form of video switches 17 and switch control circuits 18, connect the selected delay line tap to an output line 19 for passage to a connected video output 21.

As an example of this operation, assume that the video synchronizing waveform is just leaving the first delay lines 11 and at this time a leading edge of horizontal reference is applied to permit selection pulse generator 16. Generator 16 in turn issues a signal to one of the inputs of each of sequence detection circuits 14 as more fully described herein enabling these circuits to respond to their remaining input from their associated sync pulse detector 13 via AND gates 23. Shortly thereafter, a tap 22 between the first and second delay lines receives the leading edge of the video sync and causes the associated sync pulse detector 13 to apply a switching signal to the associated circuit 14, which in turn operates switch control 18 and the associated video switch 17. The video signal connected from tap 22 to line 19 passes through a series of output correction and processing stages to video output 21.

The detection circuitry does not merely sense coincidence of reference and video sync. It is unlikely that precise coincidence will occur each time between the leading edge of the reference waveform and leading edge of the video synchronizing signal at one of the delay line taps. Thus, the detection circuitry functions to detect the first leading edge of video sync to occur after the corresponding leading edge of the horizontal reference timing signal. Nor does the detection circuitry operate in response to mere concurrence or coincidence of both video sync and reference sync tips (these signals having finite widths are referred to as sync tips), as this would not satisfy the "after" requirement, namely, first video leading edge after reference leading edge. In order to provide this "first" and after function, each of sequence detection circuits 14 include a gate 20 which is a.c. coupled to an R-S flip-flop 24.

During operation, permit selection pulse generator 16 issues a signal over line 26 in response to the leading edge of the horizontal reference waveform. The signal issued over line 26 enables gate 20, via a J input of circuit 14, to through AND gate 23 to the sync pulse detector 13 associated with tap 22. When the leading edge of video sync appears at tap 22, AND gate 23 responds by issuing an output signal to the J' input of circuit 14. Previously to this, gate 20 has been conditioned by the permit selection pulse generator to enable the J' input to respond to the output of AND gate 23 and thereby dispose flip-flop 24 in its set condition. The output of gate 20 is a.c. coupled to the set input (S) of flip-flop 24 while the K input of circuit 14 is a.c. coupled to the reset (R) input such that these inputs are responsive to certain polarities of signal transitions. These conditions enable flip-flop 24 to be disposed in its set condition only if line 26 has been first activated by a permit selection pulse and, thereafter, an output is received from AND gate 23.

In its set condition, the Q output of flip-flop 24 is high. In this state, it activates the associated switch control 18 via a data input, D, to cause it to assume its set condition. The Q output of the control 18 thereby closes video switch 17 over a line 27. Flip-flops 24 are returned to their reset condition by the trailing edge of the permit selection pulse on line 26. The K input to each of circuits 14 is a.c. coupled to flip-flop 24 and is responsive only to a particular polarity of logic transition, in this instance the polarity transition associated with the trailing edge of the selection pulse on line 26. The foregoing logic restricts the functioning of sequence detection circuits 14 to select only that delay line tap at which the first video sync following reference sync occurs.

Once this selection of a tap is performed, the Q output of one of flip-flops 24 will, in addition to operating the associated switch control 18, activate an inhibit select pulse generator 28 through an OR gate 29. Each of the inputs to gate 29 is connected to the Q output of a separate one of flip-flops 24 as shown. Pulse generator 28 issues, over line 31, a signal to one of the inputs of each of AND gates 23 disabling such gates from responding to subsequent sync pulse detector signals. Thus, a selection once made disables the further operation of the remaining switch controls 18.

Furthermore, inhibit pulse generator 28 has its output line 31 connected to the clock inputs, C, of each of switch controls 18 so as to dispose such controls in a condition dictated by the instantaneous logic level at the data input, D. In this instance, the data input is activated by the Q output of an associated flip-flop 24. Accordingly, a switch control 18 which has been disposed in its set condition during the previous measurement of a video line interval is reset by the occurrence of an inhibit pulse on line 31, as the data input D, at that time is in its low condition, (assuming that the same delay tap has not been selected). Conversely, the selected switch control 18 receives a high logic signal at the D input which is immediately followed by a signal at the C input from generator 28, causing the control to assume its set switching condition. The associated video switch 17 operates in response thereto.

It will be observed that the operating conditions of the disclosed network introduce a time shift distortion or error into the leading edge of the video synchronizing waveform as it appears on output line 19. In particular, if the detection circuitry operates to select a tap including a greater delay than the previously selected tap, the leading edge of the video sync waveform will coincide with that of the video signal as it appears at the upstream tap. In other words, the video sync waveform is improperly stretched. A stretch sync inhibit circuit 32 is provided to cancel this erroneous leading edge of the output sync waveform.

In particular, this is achieved by passing the video on output line 19 through a video gate 33 of inhibit circuit 32 and operating gate 33 in accordance with the sequence of signals appearing at the input line 12 to the delay line path and the output line 31 from inhibit circuit pulse generator 28. A gate control circuit 34 has a set input responsive to the leading edge of video sync on input line 12 disposing the control circuit in its set condition, which in turn operates gate 33 to "gate-off" the video signal. Gate control 34 remains in its set condition until it receives a signal over line 31 indicating that a delay line tap has been selected, this being generally coincidental with the occurrence of the leading edge of video at the selected tap. In response thereto, gate 34 receives a reset signal through an OR gate associated with the reset input causing the gate control to assume its reset condition and gating the video on again. This function of control 34 and gate 33 effectively cancels that portion of the video synchronizing waveform erroneously introduced by switching from one tap of delay lines 11 to another downstream. To avoid the undesirable and possible consequence of gate control 34 failing to receive a reset signal from inhibit pulse generator 28, the reset input of control circuit 34 is alternatively responsive, through the OR gate to the video synchronizing waveform of the output tap of the last serial fixed delay line over line 36. This back-up signal serves as an inhibit release pulse to restore the video gate to its on condition allowing video to pass to output 21.

Circuitry is also provided for arbitrarily selecting one of the delay taps for connection to output line 19 in the event the video signal waveform is out of the delay connection range of the detection and switching circuitry. Complete loss of video at output 21 is thereby avoided; it being preferable that some signal appears at the output even though it is incorrectly timed. For this purpose, an AND logic circuit 37 is provided including an AND gate 38 having inputs responsive to each of the $\overline{Q}$ outputs of separate switch controls 18. In the event all of switch controls 18 are disposed in their off condition, AND gate 38 issues an output signal. Assuming this happens, the output from gate 38 is inverted and applied through an OR gate 39 to the output line 27 from one of switch controls 18, thereby, operating the associated video switch irrespective of the state of the switch control itself. In this instance, AND logic circuit 37 is connected to the video switch associated with a central tap 41, located halfway between the input and output of the delay line series.

A soft clamp 46, i.e., a clamp circuit having a slow time response, is connected to the input of the tapped delay line sections and a hard clamp 47, i.e., fast-acting clamp circuit, is connected to the video output. The use of soft clamps and hard clamps, individually, in connection with video signal systems, is, of course, known per se. However, it has been found that the successful operation of the time-base error correction circuit, involving as it does the passage of the video signal through diverse delay line paths and through various switching devices, is due in part to the provision of hard or fast-acting d.c. restoration at the video output. Soft clamp 46 is of a conventional design, well known to those skilled in the art, and provides for slowly eliminating over a plurality of horizontal line periods any d.c. offset errors in the video signal. That is, a slow clamp refers to one having a time constant greater than the one horizontal line period and typically requiring from 5 to 20 video lines before stabilizing at an average d.c. correction. This provides for eliminating average d.c. offset errors so that any d.c. errors which are introduced in the signal by reason of passage through the delay lines and video switches lies within the correction range of hard clamp 47. After d.c. restoration by soft clamp 46, the video is fed through a sync regeneration network including a sync height limiter circuit 51 for limiting the negative excursion of synchronizing waveform, a circuit 52 for removing sync from the video, an implifier rise time generator 53 in series with circuit 52 for developing new leading edge for the synchronizing waveform, and a circuit 54 for adding the regenerated sync waveform to the sync height limited video signal received from circuit 51.

After sync regeneration, the video is fed through the first stage of time-base correction provided by fixed delay lines 11. Following this corrective operation, and after passage through the stretch sync inhibit circuit 32, video is passed through a second stage of tapped delay lines 56 which, in this instance, is essentially equivalent to the delay lines 11 and associated switching circuitry described above.

In the illustrated embodiment, the first stage of tapped delay lines 11 provides a very coarse time-base error correction in that the values of fixed delay lines 11 are larger than each of the delay lines included in the second stage 56. By using a first set of relatively larger value delay lines followed by a second stage of relatively small value fixed lines, an efficient cost per delay unit of correction range is achieved.

Following the second stage of correction, hard clamp 47, as indicated above, functions to clamp or d.c. restore each horizontal line period to a desired d.c. level. As used herein, "hard clamp" refers to the ability of the clamping circuit to correct or restore each video period, in this instance a horizontal line, to a desired d.c. level. This fast response clamping is performed during the video sync tip of each horizontal line. It is this combination of a soft clamp at the input to the switched video followed by a hard clamp at the output which is believed to contribute substantially to the successful operation of time-base error correction circuit.

The present invention is a particularly constructed hard clamp circuit 47, which is especially suited for use in restoring the d.c. voltage of each horizontal line period of a video signal to a desired d.c. voltage level. However, it will be appreciated that the hard clamp circuit of the present invention is also suited for restoring other signals, particularly, periodic or repetitive signals, to a desired d.c. voltage level. The hard clamp circuit of the present invention, as illustrated in greater detail in FIGS. 3 through 5, has the characteristic advantage of isolating the clamping circuitry from the video signal path. With reference to the embodiment of the hard clamp circuit illustrated by FIGS. 3 and 4, the video path 61 extending from the output of the second stage of tapped delay lines 56 to the input of the last stage of correction as shown in FIG. 2 is provided with a clamping point of junction 62 connected to the clamping circuitry 63. As will be demonstrated in greater detail, the video signal path 61 does not pass through any reactive components nor are there any switching elements immediately in communication with junction 62. A further characteristic feature of this particular clamping circuit is its extremely fast response, functioning quickly enough to clamp each video line during the synchronizing tip of the horizontal blanking interval.

The circuit of FIGS. 3 and 4 operate in the following manner. A comparator 64 responds at one input to the video line voltage at junction 62 and at the other input to a clamp reference voltage. The output of comparator 64 assumes one or the other of two discrete values, lying at either a high or low logic state, depending on whether the video at junction 62 during the measurement mode is above or below the clamp reference. A control logic circuit 65, enabled by a sync input signal which is derived from video sync by means of a sync stripper 50, responds to the output of comparator 64 and activates either a positive constant current source 66 or a negative constant current source 67, depending on the logic state at the output of the comparator. A storage means or holding capacitor 68, together with a buffer or operational amplifier 69, functions to develop an increasing or decreasing voltage at junction 62 proportional to the charge on storage capacitor 68, thereby adding or subtracting an appropriate d.c. offset to the video signal level. A resistor 71 serves to isolate the low impedance output of buffer 69 from junction 62. The input to comparator 64 is of high impedance and thus, junction 62 is isolated at both ends of circuit 64 from the internal switching operations thereof by suitable impedance buffer or isolation means.

As an example of the sequence of operations, if the video sync tip at clamping junction 62 is below clamp reference, comparator 64 and control logic 65 operate to activate positive current source 66 which in turn pumps a steady stream of current into capacitor 68, rapidly increasing the voltage at junction 62. As the voltage at clamping junction 62 crosses the clamp reference level, the logic condition of the comparator output changes state causing the control logic circuit 65 to disable or turn off positive current source 66, leaving junction 62 at the correct d.c. voltage. In general, the operation of the circuit in response to a video sync tip at junction 62 lying above clamp reference is similar, with the following exception. Control logic 65 functions to turn off both current sources only in response to the voltage at junction 62 crossing the clamp reference level in a particular direction. The purpose and operation of this unidirectional response of control logic 65 will be discussed in further detail in connection with the schematic diagram of FIG. 4. The entire searching sequence for the correct d.c. voltage occurs within the time width of the horizontal sync tip. Once the correct offset is reached, it is held or stored on capacitor 68 for the duration of the succeeding video line.

Figure 3:
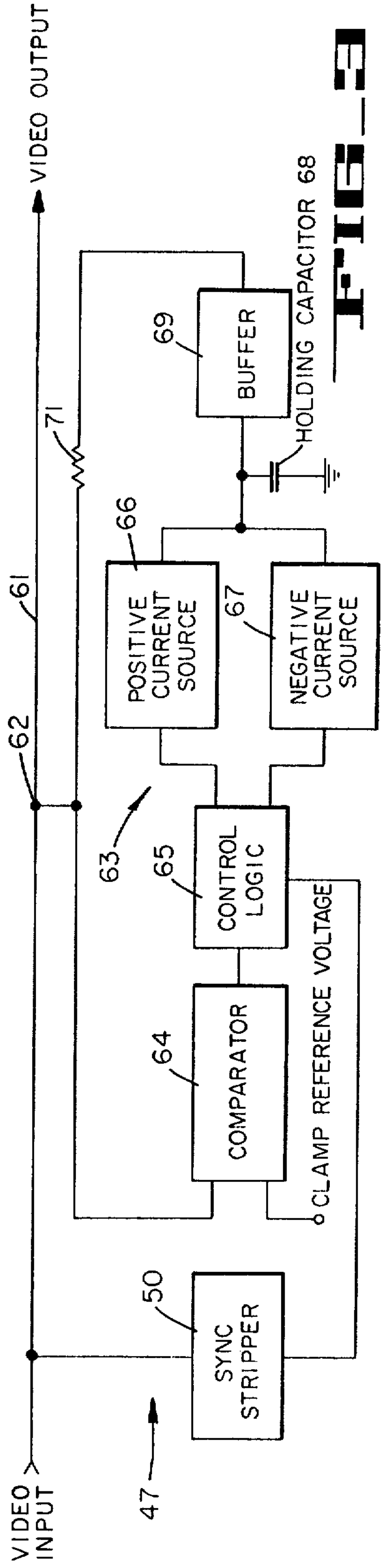
FIG. 3 is a block diagram illustrating a clamping circuit constructed in accordance with the present invention and employed in the system of FIG. 2.

The construction and operation of hard clamp 47 of FIG. 3 is based on a digital or discrete level logic in which the correction of the offset error is performed at discrete current and voltage levels, except for the variable charge on capacitor 68. This principle of operation is believed to provide for the exceedingly reliable and fast-acting functioning of the circuit. Furthermore, the use of logic control as opposed to analog control significantly reduces the manufacturing cost of the network.

Figure 4:
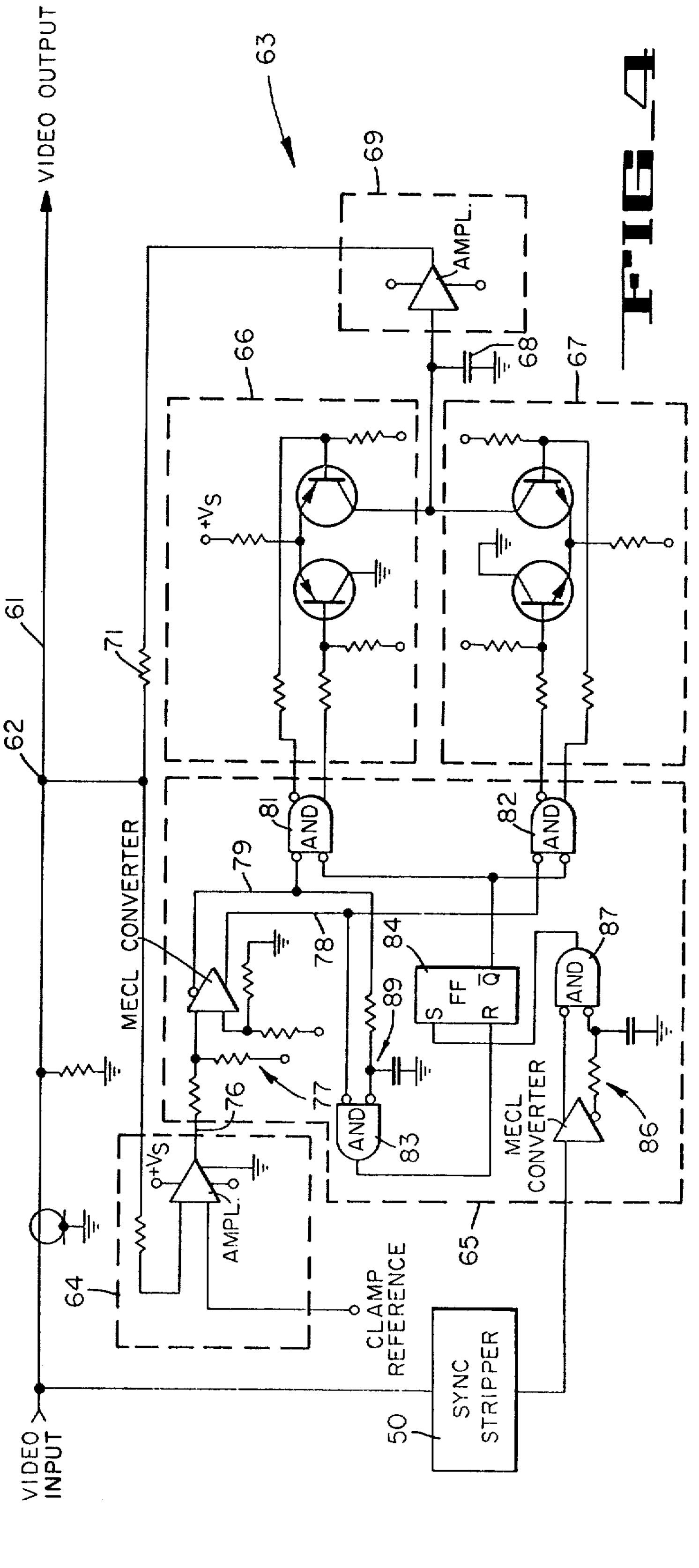
FIG. 4 is a detailed schematic diagram of the clamping circuit of FIG. 3.

With reference to FIG. 4, comparator 64 is, in this instance, formed by a TTL (transistor-transistor logic) logic device having an output 76 which is coupled to control logic 65 through an input converter stage 77 in this instance comprising a MECL (Motorola emitter coupled logic) converter serving to transform the TTL logic on line 76 to MECL logic upon which the control logic 65 is based. The output of the MECL converter 77 issues separate signals of complementary states over lines 78 and 79, which are coupled as shown to a pair of AND gates 81 and 82 operating the positive and negative current sources 66 and 67. Another AND gate 83 has an input connected directly to output line 78 and a second input connected through a RC (resistive-capacitive) delay network to output line 79. AND gate 83 serves to disable AND gates 81 and 82 through an RS flip-flop 84, thus turning off the current sources in response to a particular transition of logic states of the output of comparator 64. In particular, and as indicated briefly above, the control logic 65 of FIG. 4 operates to turn off the current sources only as the d.c. voltage of clamping junction 62 crosses the desired or clamp reference voltage from below to above (low to high). This functioning has the important advantage of always disposing the final voltage correction at junction 62 slightly above the reference level, rather than above or below depending on the polarity of the added d.c. correction. In this fashion, a greater line-to-line accuracy in the clamping level is insured.

Thus, assuming that the sync tip at junction 62 lies above reference, as sync input is received by sync stripper 50 and converted to MECL logic by a converter 86, an output from AND gate 87 sets flip-flop 84, which in turn enables the pair of AND gates 81 and 82 from the $\overline{Q}$ output of the flip-flop. Depending upon the logic condition of comparator 64, the output lines 78 and 79 will enable one of AND gates 81 and 82 to turn on the appropriate one of current sources 66 and 67. Assuming that the video signal is initially above the clamp reference, comparator 64 and control logic 65 function to turn on current source 67 driving the voltage at clamping junction 62 downward. The video voltage at junction 62 during sync tip thus crosses the reference voltage in a high to low direction causing comparator 64 to change state which in turn switches the logic condition of the complementary output lines 78 and 79. After this switching, AND gate 82 turns off negative current source 67 and AND gate 81 turns on positive current source 66. The voltage on holding comparator 68 responds by raising the voltage level at junction 62 until clamp reference is again crossed, although in this instance from a low to high direction. Output lines 78 and 79 again switch logic states and RC delay network 89 at one of the inputs to AND gate 83 sustains the former voltage condition at such input and gate 83 thereupon responds to the changed voltage state at the other input, issuing an output signal resetting flip-flop 84. Flip-flop 84 is thus restored to its original condition in which AND gates 81 and 82 are disabled by the $\overline{Q}$ output of the flip-flop device. The foregoing sequence of operations takes place entirely within the sync tip of a horizontal blanking waveform. The illustrated RC network connected between converter 86 and AND gate 87 provides a selective response so that only the leading edge of video sync sets flip-flop 84.

Figure 5:
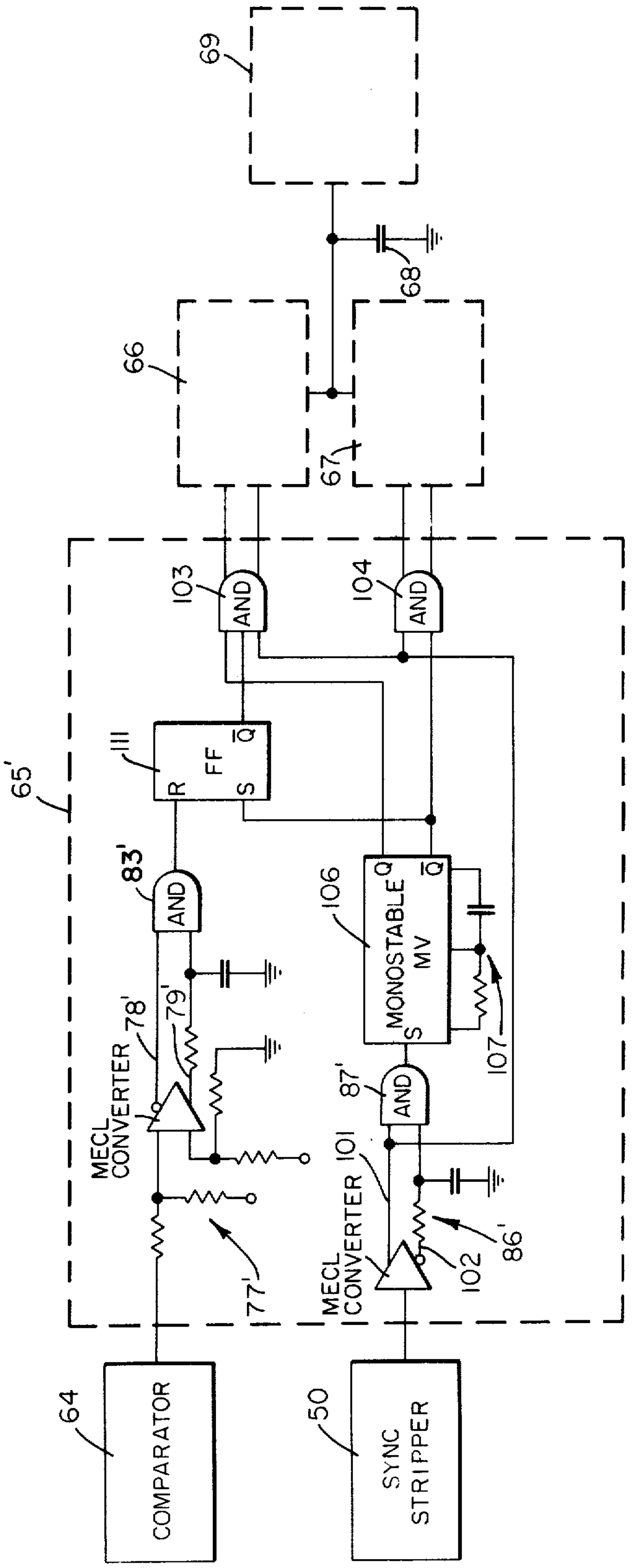
FIG. 5 is a detailed schematic diagram of an alternate embodiment of the control logic for use in the clamping circuit of FIG. 4.

For applications where higher resolutions are desired, the control logic embodiment 65' of FIG. 5 is substituted in the hard clamp circuit 63 for the embodiment 65 illustrated in FIG. 4. The control logic 65' is enabled in the same manner as the control logic 65 illustrated in FIG. 4. However, in contrast to the FIG. 4 embodiment, the enabled control logic 65' operates to cause both the positive and negative current sources 66 and 67 to provide current to the holding capacitor 68 during the horizontal sync pulse interval regardless of the actual voltage level of the sync pulse tip present at junction 62. More specifically, the sync input signal derived from the video sync pulse by the sync stripper 50 is coupled to the MECL logic converter 86', which responsively issues separate pulse signals of complementary states over lines 101 and 102. The pulse signal issued over line 101 is used as an enable pulse for the AND gates 103 and 104, the enable pulse functioning to insure that the current sources 66 and 67 are activated only during the sync tip interval. The pulse signals output by the converter 86' also are coupled through and AND gate circuit 87', which functions as a pulse forming circuit to produce a short duration pulse to trigger the monostable multivibrator 106. The multivibrator 106 responds to the short duration pulse by switching to its quasi-state and, thereby produce a pulse that begins shortly after the leading edge of the horizontal sync pulse at junction 62 and ends at a time when the multivibrator 106 returns to its stable state. The end of the pulse is determined by the multivibrator's RC network 107. In the illustrated embodiment, the components of the network 107 are selected preferably to cause the quasistable state to end after, hence, the provided pulse to have an interval of less than one-half the horizontal sync pulse interval.

The $\overline{Q}$ output of the multivibrator 106 is connected to a second input of the AND gate 104. When in the quasi-stable state, the $\overline{Q}$ output together with the enabling pulse from converter 86' conditions AND gate 104 to activate the negative current source 67. At the same time, the Q output of the multivibrator 106 is in a complementary state, thereby, disabling AND gate 103. The disabled AND gate 103 insures that the positive current source 66 remains deactivated during the interval that source 67 is activated.

With the negative current source 67 activated, the storage capacitor 68 is charged negatively until positive current is supplied by the positive current source 66.

At the end of the quasi-stable state of the multivibrator 106, the Q output of the multivibrator returns to the state which provides another enabling signal to the second input of the AND gate 103. Simultaneously, the state at the $\overline{Q}$ output of the multivibrator 106 returns to that which disables AND gate 104, hence, deactivating the negative current source 67. Additionally, the $\overline{Q}$ output of the multivibrator 106 is coupled to the set input, S, of the flip-flop 111. When the multivibrator 106 returns to its stable state, the flip-flop 111 responsively issues at its $\overline{Q}$ output a third and last enabling state signal to the third input of the AND gate 103.

The three enabling inputs to the AND gate 103 condition it to activate the positive current source 66 to supply positive current to the storage capacitor 68. As positive current is provided to capacitor 68, its voltage level rises towards the d.c. voltage desired at junction 62. When the level of the voltage across capacitor 68 rises to that which causes the voltage at junction 62 to reach a level corresponding to the clamp reference at the input of the comparator 64, the comparator 64 produces a logic condition transition at the input to the control logic circuit 65'. The MECL logic converter circuit 77' responds to the logic condition transition by causing selected transition direction change in the logic conditions of the complementary lines 78' and 79'. An AND gate circuit 83' is coupled to the lines 78' and 79' to form a short duration pulse in response to the selected transition direction change in the lines' logic conditions. This short duration pulse is coupled to the reset input, R, of the flip-flop 111 and causes the flip-flop to be placed in state that removes the enabling input from the AND gate 103. Removal of the enabling input disables the AND gate 103 and, thereby, deactivates the positive current source 66. In this fashion, the supply of current to the storage capacitor 68 is terminated and the stored voltage maintained (at least for the remaining interval of the horizontal line of video) at a level corresponding to the one desired at junction 62.

With the flip-flop 111 reset, the monostable multivibrator 106 and flip-flop 111 are restored to their original conditions, which disable the AND gates 103 and 104 and deactivate the current sources 66 and 67. They remain in their original conditions until the next sync pulse occurs at the junction 62. At the occurrence of the next sync pulse, the sync stripper 50 again causes the monostable multivibrator 106 to initiate the negative followed by positive current cycle of operation.

It will be seen that the control logic embodiment 65' illustrated by FIG. 5 operates first to deliver negative current to the storage capacitor 68 and, thereby, reduce the stored voltage well below that level corresponding to that desired for junction 62, and then to deliver positive current to the capacitor 68 until the stored voltage reaches the level corresponding to that desired for junction 62. This operation occurs whether the voltage of the sync pulse at junction 62 is originally offset above or below the desired level. By first reducing the stored voltage and then raising it, the voltage at junction 62 can be resolved to a very high degree, resolutions of fractions of a percent of the sync pulse voltage level being easily obtainable.

Following the d.c. restoration by hard clamp 47, a vernier corrector 91, as shown in FIG. 2, provides a final time-base error compensation. Preferably, corrector 91 is a voltage variable delay line or lines responsive to horizontal reference and, in color systems, to the color subcarrier reference. Such a time-base error corrector is disclosed in U.S. Pat. No. 3,213,192. The final stage, circuit 92, provides for processing the video signal, e.g., regenerating or adding new sync signals, and is of a construction well known to those skilled in the art.

What is claimed is:

1. A circuit for clamping a circuit point in a signal path to a particular reference voltage, comprising:

a storage means for holding voltage;

buffer means coupling said storage means to said circuit point such that the voltage thereat assumes a value determined by the instantaneous amount of voltage held by said storage means;

current source means responsive to first and second successive commands to pass current to said storage means to charge same to a voltage, said current source means responsive to the first of said successive commands to pass current to said storage means to charge same in a first direction to a voltage different than a voltage corresponding to said particular reference voltage, said current source means responsive to the sound of said successive commands to pass current to said storage means to charge same in a second direction opposite the first direction until the stored voltage reaches said voltage corresponding to said particular reference voltage;

command generator means responsive to each one of periodically occurring pulse signals to generate said first and second successive commands;

impedance isolation means connected to said circuit point; and means including a comparator having a first input coupled to said impedance isolation means to receive a signal representative of the voltage level at said circuit point and a second input coupled to receive a signal representative of the reference voltage, said comparator responsive to the voltage level at said circuit point obtaining said particular reference voltage while said currrent sources means passes current to said storage means in response to the second of said successive commands to terminate the passage of current to said storage means until the next pulse signal is received by said command generator means.

2. The circuit of claim 1 further comprising a first electronic gate responsive to said first command to enable said current source means to pass current to charge said storage means in the first direction, and a second electronic gate responsive to said second command to enable said current source means to pass current to charge said storage means in the second direction, said second electronic gate further responsive to said comparator to disable said current source means in response to the voltage level at said circuit point attaining said particular reference voltage.

3. The circuit of claim 2 wherein said signal path passes video signals including horizontal sync pulses each having a sync tip at a voltage level nominally equal to said particular reference voltage, said current source means includes a negative current source and a positive current source, said negative current source responsive to the first of said successive commands to charge said storage means until the stored voltage reaches a level less than said voltage corresponding to said particular reference voltage, said positive current source responsive to the second of said successive commands, and said command generator means is responsive to each horizontal sync pulse to generate said first and second successive commands.

4. The circuit of claim 3 wherein said command generator means includes means for stripping the horizontal sync pulse from said video signal, and a monostable multivibrator responsive to the stripped horizontal sync pulse to be placed in its quasistable conduction state for a selected interval and issue said first command, said multivibrator returning to its stable conduction state at the end of said interval to remove said first command and issue said second command, said first electronic gate responsive to said first command to enable said negative current source, and said second electronic gate responsive to said second command and to said comparator to enable and disable said positive current source.

* * * * *